SPECTROMETER

Original Filed July 18, 1967 3 Sheets-Sheet 1

INVENTOR
ANTHONY R. BARRINGER
JOSEF PEP SCHOCK
BY
Rogers, Bereskin, & Parr

SPECTROMETER

Original Filed July 18, 1967 3 Sheets-Sheet 2

INVENTOR
ANTHONY R. BARRINGER
JOSEF PEP SCHOCK
BY
Rogers, Bereskin, & Parr

SPECTROMETER

Original Filed July 18, 1967 3 Sheets-Sheet 3

INVENTOR
ANTHONY R. BARRINGER
BY JOSEF PEP SCHOCK
Rogers, Bereskin, & Parr

United States Patent Office

Re. 28,216
Reissued Oct. 29, 1974

28,216
SPECTROMETER

Anthony Rene Barringer, Willowdale, Ontario, Canada, and Josef Pep Schock, Cambridge, Mass., assignors to Barringer Research Limited, Rexdale, Ontario, Canada Original No. 3,518,002, dated June 30, 1970, Ser. No. 654,202, July 18, 1967, which is a continuation-in-part of abandoned application Ser. No. 559,792, June 23, 1966. Application for reissue Jan. 27, 1972, Ser. No. 221,455

Int. Cl. G01j *3/42*

U.S. Cl. 356—93 21 Claims

Matter enclosed in heavy brackets [ ] appears in the original patent but forms no part of this reissue specification; matter printed in italics indicates the additions made by reissue.

ABSTRACT OF THE DISCLOSURE

A direct reading remote sensing spectrometer having a mask containing lines corresponding to the characteristics spectrum of a particular gas or vapour. The mask is positioned in a plane where spectra are formed, and the light beam passing through the spectrometer is vibrated in the direction of the dispersion of the light so that the spectra sweep across the lines of the mask. The intensity of the light passing through the mask is varied only when the spectra correlate with the lines of the mask, and the intensity variations are analyzed to indicate the concentration of the gas or vapour giving rise to the spectra.

Figure 1:
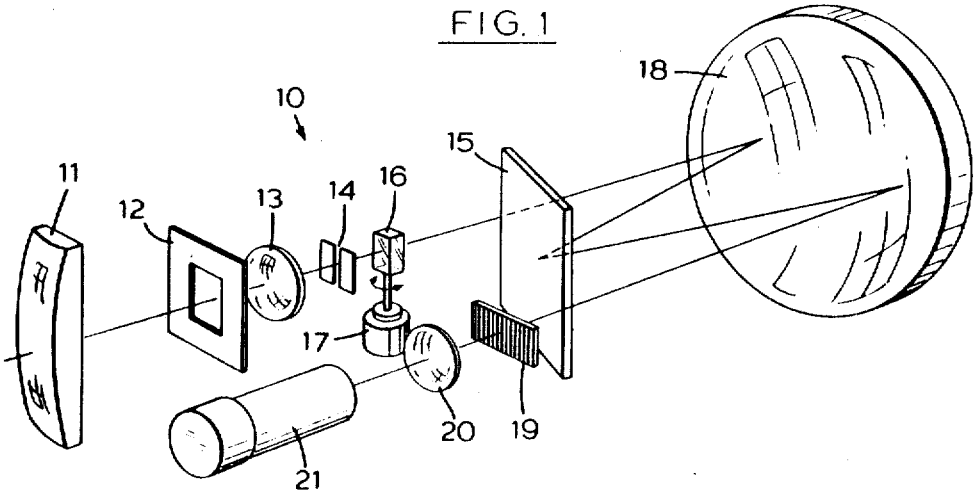

This application is a continuation-in-part of application No. 559,792, filed June 23, 1966, now abandoned.

This invention relates to the spectrochemical analysis of substances having characteristic spectra, and in particular to a remote sensing optical spectrometer for analyzing gases and vapours by automatically correlating the characteristic spectra of a particular gas or vapour with an array of lines on a mask.

Spectrochemical analysis refers to the chemical identification and quantitative analysis of matter by means of emission and absorption spectra that are uniquely characteristic of atoms and molecules. The positions and intensities of the spectra characterize the atoms of molecules that produce them. The word spectra includes line spectra that are characteristic of atoms and ions and band spectra that are characteristic of molecular gases and chemical compounds.

A conventional spectrometer essentially consists of an entrance slit, a collimator, means for dispersing the light to separate the constituent wavelengths of the light, a focussing element to produce images of the entrance slit at positions corresponding to the constituent wavelength, an exit slit positioned in the plane where the images are formed, and a photodetector for indicating the intensity of the light passing through the exit slit. In order to identify the existence of a particular gas or vapour having a complex spectrum, the dispersed light is examined at a number of wavelengths corresponding to the wavelengths of known spectral lines of the particular gas or vapour. One prior type of spectrometer employed a number of exit slits each positioned at the location of a particular spectral line. A photomultiplier was placed behind each exit slit, and the outputs of the photodetectors were compared. Although measurements can be made with this type of spectrometer more quickly than with conventional photographic spectrometers (wherein the spectrum is photographed and subsequently compared with a master spectrum containing all the spectral lines of interest), this type of spectrometer is relatively bulky, costly, and inflexible. Examples of prior art spectrometers using masks having a plurality of lines or multiple exit slits include Rosenthal, U.S. Pat. No. 3,012,467; Bottema et al., Astrophysics Journal, volume 139, pages 1021, 1964 (see also Annales d'Astrophysique, volume 28, pages 225, 1965) and Bolz, U.S. Pat. No. 3,052,154. However, these prior spectrometers bear only superficial similarities to the present invention and do not achieve the applicant's results, which will be apparent from a study of the invention described herein.

In a preferred form of the present invention, a light beam containing absorption or emission spectra enters the entrance slit of the spectrometer, is colliminated to render it parallel, dispersed to separate its constituent wavelengths and obtain a spectrum, transmitted through a mask, and detected by a photodetector. Spectral images are focussed at the mask, and the mask is provided with a series of lines at positions corresponding to the positions of the spectral images at the mask. Each particular substance to be analyzed has a specific mask with a unique arrangement of lines corresponding to the characteristic spectra of the substance. The light beam is slightly vibrated at a constant frequency, and when the characteristic spectra are present in the light entering the spectrometer, the lines of the mask and the spectral images are periodically aligned with each other thereby causing the light passing through the mask to be modulated at the vibration frequency of the light beam or a harmonic thereof, as will be explained. The output of the photodetector consists of a direct current (D.C.) voltage that is proportional to the intensity of the incoming light. When the incoming light contains the characteristic spectra and the spectral images correlate with the lines on the mask, the D.C. voltage is modulated by an alternating current (A.C.) voltage at the vibration frequency. The level of the A.C. voltage, when compensated for changes in the ambient intensity of the incoming light or background illumination, is indicative of the intensity of the characteristic spectra, and an electronic circuit described below is provided for indicating the amount of modulation. As the A.C. frequency is reasonably high (e.g. between about 20–1000 c.p.s., advanced signal processing techniques such as synchronous detection can be conveniently, with the result that the sensitivity of the spectrometer as well as its freedom from interference from other substances is very high. In addition, the electronic circuit is provided with means for compensating for changes in the intensity of the incoming light, as will be described.

The word "light" used in the following specification includes not only visible light but also invisible light such as ultraviolet and infrared. Substances which can be detected by the correlation technique referred to above include the halogens, sulphur dioxide, nitrogen dioxide, and in general any other elements and compounds having a plurality of absorption lines or bands.

Principles of the invention are applicable to the investigation of both emission and absorption spectra in the laboratory, but the spectrometer described in detail herein is particularly designed for the investigation of absorption spectra in sunlight produced by gases and vapours present in the atmosphere of the earth or other planets. The measurements can be made on the ground from fixed or mobile stations, in survey aircraft or in orbiting spacecraft.

An important application of the invention is the investigation of air pollution. A very troublesome pollutant is sulphur dioxide, which sometimes reaches harmful concentrations in major cities. Sulphur dioxide has a complex cyclic molecular band structure and is well suited to analysis by means of this invention.

Figure 2:
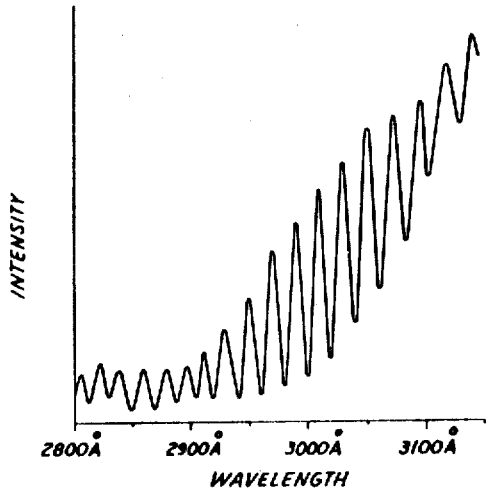
Figure 3:
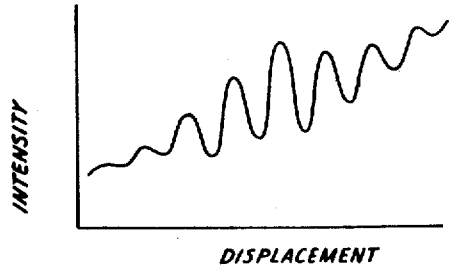

Preferred embodiments of the invention are described in detail below and are illustrated in the accompanying drawings, wherein:

FIG. 1 is a somewhat diagrammatic perspective view showing the principal optical elements of a preferred form of a spectrometer, utilizing a diffraction grating for dispersion, FIG. 2 is a graph showing a portion of the absorption spectrum of $SO_2$ gas, FIG. 3 is a graph showing the intensity of light transmitted through the mask as a function of relative lateral displacement between the lines of the mask and the spectral images, the spacing between the spectral images being reasonably regular.

Figure 5:
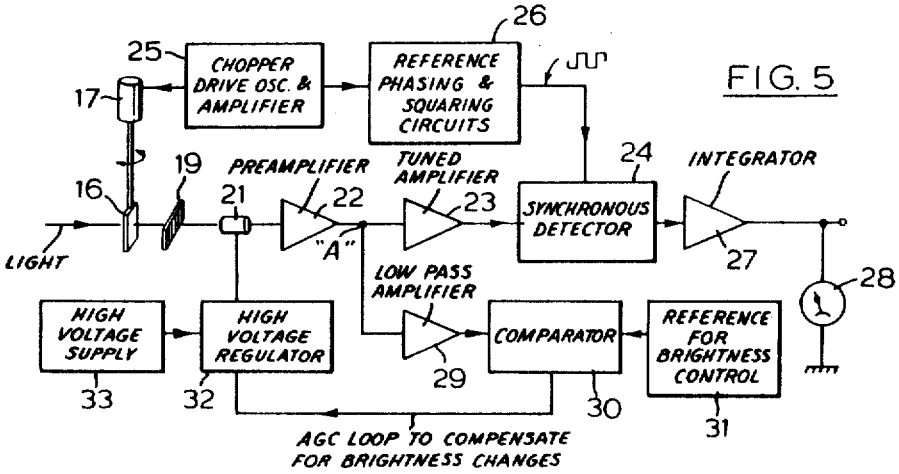
Figure 4:
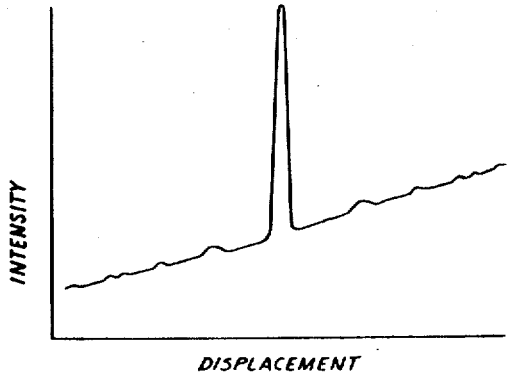
Figure 7:
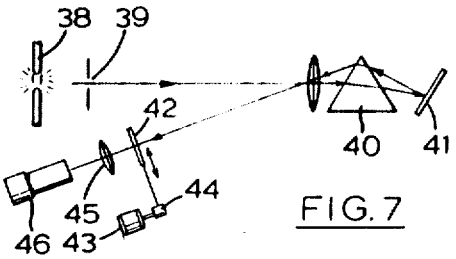
Figure 8:
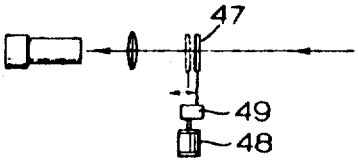
Figure 9A:
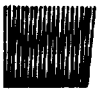
Figure 6:
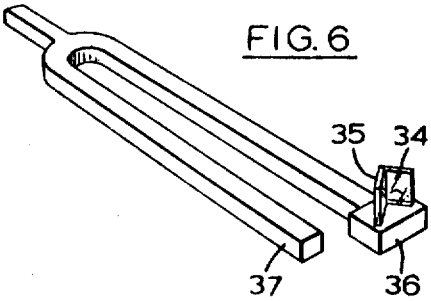
Figure 9:
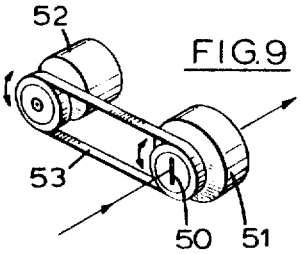
Figure 10:
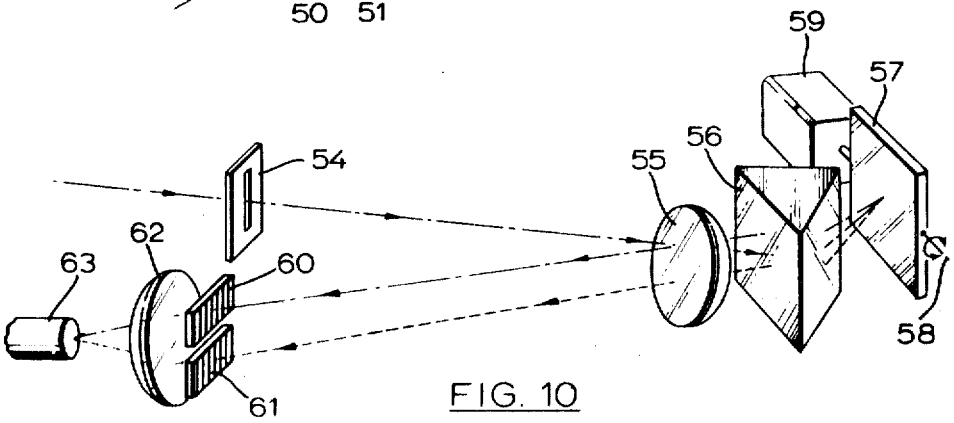

FIG. 4 is a graph similar to FIG. 3 wherein the spectral images are irregularly spaced, FIG. 5 is a block diagram of an electronic circuit for processing the output of the photodetector, FIG. 6 is a perspective view of an alternative arrangement for varying the relative lateral positions of the spectral images and the liens of the mask, FIG. 7 is a diagrammatic view of another embodiment of the invention wherein the mask is vibrated and wherein a prism is used for dispersion, FIG. 8 is a diagrammatic view of yet another embodiment of the invention, wherein the mask is vibrated cyclically into and out of the plane where the spectral images are focussed, FIG. 9 is a diagrammatic view of an arrangement wherein the spectral images are cyclically rotated relative to the lines of the mask, FIG. 9*a* is a view showing the relationship between the spectrum produced by the apparatus of FIG. 9 relative to the lines of the mask, and FIG. 10 is a perspective view of a still further embodiment of the invention.

Referring now to FIG. 1, a spectrometer 10 includes an objective lens 11 which collects light from a remote region of interest and forms an image of the region at the position of a field stop 12. A lens 13 forms an image of the objective lens 11 at a slit 14, and forms an image of the field stop 12 on a diffraction grating 15. The field stop 12 is dimensioned to block light which would not strike the grating 15. The grating 15 is preferably as large as possible in area, and the slit 14 is preferably as wide and as high as possible to provide optimum light gathering power. A transparent refractor plate 16 is located in the light path behind the slit 14, and the light beam is vibrated or oscillated by means of a torsional chopper 17 that operates the refractor plate 16. The opposed faces of the refractor plate 16 which are normal to the light beam are essentially parallel and optically flat. After passing through the refractor plate 16, the light beam is reflected from a concave mirror 18 known as an Ebert mirror and thence to the diffraction grating 15. The light beam is dispersed into its constituent wavelength by the difraction grating 15, and the dispersed light is reflected back towards the mirror 18, which focusses the spectrum produced by the diffraction grating 15 in the plane of the mask 19. Light transmitted through the mask 19 is refracted by a lens 20 towards the sensitive face of a photodetector 21. The photodetector is a light sensitive device such as a photomultiplier, photoresistor, photovoltaic cell, photodiode and the like. A conventional filter (not shown) is preferably positioned in the light path to eliminate wavelengths outside the wavelength region of interest.

When the light entering the spectrometer contains the characteristic spectra of a particular substance, such as those of sulphur dioxide gas ($SO_2$), spectral images are formed in the plane of the mask 19. In the case of $SO_2$, the spectral images correspond to the absorption bands shown in FIG. 2. Note that the spacing of the peaks of the absorption bands is about 20 A.

The mask 19 is provided with a pattern of lines defined by alternatively relatively transparent and opaque regions at positions corresponding to specific wavelengths of the characterisic spectra of the substance being analyzed. The spectrometer can be used to make its own mask 19, as follows. The particular example given is that of $SO_2$ gas, but it will be understood that similar procedures can be employed for other gases. To make a mask for $SO_2$, light from a broad UV source which has shone through $SO_2$ gas is directed into the spectrometer to produce an $SO_2$ spectrum at the mask 19. The mask 19 is preferably a thin glass plate having a photographic emulsion coating that is exposed to the $SO_2$ spectrum. The emulsion is developed, and the resulting lines on the mask 19 constitute an exact replica of the spectrum formed at the mask 19. In the case of $SO_2$, the preferred wavelength range is 2850–3150 A. so that the mask 19 will contain about 15 lines corresponding to the 15 bands in this range. Note, however, that wavelengths below about 3000 A. tend to be absent in sunlight.

It appears that optimum correlation is achieved when there is maximum contrast between adjacent lines of the mask 19. The widths of the lines correspond to the linewidths of the absorption lines or bands, and the spaces between the lines are transparent and are similar in width to the lines in the case of a regular spectrum such as that of $SO_2$. To enhance the contrast, it has been found desirable to rule lines with India ink on the mask after the mask emulsion has been developed. Alternatively, the mask can be hand drawn with India ink on a transparent film without photographing the spectra, by calculating the positions of the spectra from the optical constants of the spectrometer. The background of the mask can either be transparent, with opaque lines or else opaque with transparent lines. In either case, the operation of the spectrometer is the same, but the polarity of the resulting A.C. modulation voltage will be opposite for the two kinds of masks.

Means is provided in the spetcrometer for varying the degree of correlation between the spectrum and the lines of the mask at a rapid and constant rate of repetition. In the embodiment of FIG. 1, such means is constituted by the refractor plate 16 which is vibrated by the torsional chopper 17. The vibration of the refractor plate 16 causes the spectral images at the mask 19 to vibrate slightly at a constant frequency. During each cycle of vibration, the spectral images are displaced in their direction of dispersion from one position wherein the spectral images are aligned with the lines of the mask to a second position wherein there is slight relative displacement between the spectral images and the lines of the mask 19. This produces an A.C. modulation in the light passing through the mask 19. The vibration frequency can be between about 20–1000 c.p.s., 100 c.p.s. or thereabouts being preferred. At higher frequencies it becomes difficult to obtain sufficient displacement amplitude; at very low frequencies, noise problems increase. The A.C. modulation is attributable to the fact that, in the position where the spectral images correlate with the lines of the mask, either a maximum or a minimum amount of light is permitted to shine through the mask, depending upon whether the lines are opaque or transparent. When the spectral images are displaced from the correlation position, the intensity of the light transmitted through the mask changes in proportion to the intensity of the spectra. In the case of reasonably regularly spaced spectra such as those of $SO_2$, a graph similar to that of FIG. 3 is obtained when the intensity of the light transmitted through the mask is plotted as a function of displacement. In the case of $SO_2$, there is a maximum difference in intensity for a shift of about 10 A., which is apparent from FIG. 2.

As the displacement is increased from 10 A., other extrema are observed in the curve shown in FIG. 3. Such extrema are caused by partial correlation between the spectra images and the lines on the mask 19. In the case of $SO_2$, for example, a partial correlation occurs when the spectral images are displaced about 20 A. from the maximum correlation position (the peak to peak spacing of the absorption bands of $SO_2$ is about 20 A.). Correlation becomes progressively less pronounced as the displacement is increased further, as indicated in FIG. 3. In the case of an irregular spectrum, there is only one strong correlation position, as indicated in FIG. 4. In such cases, the partial correlations are very much less pronounced than in the case of a regular spectrum such as that of $SO_2$.

In order to optimize the amplitude of displacement for any particular gas or vapour, a mask is first produced for the particular gas or vapour and a graph similar to that of FIG. 3 or 4 is plotted. The optimum amplitude of displacement is apparent from an inspection of the graph (it is the displacement that results in a maximum intensity difference for small shifts, e.g. of the order to the peak to peak spacing of the lines or bands). Alternatively, the optimum amplitude of displacement can be deduced by analysis of the absorption (or emission) spectrum of the gas or vapour.

While the amplitude of the resulting A.C. modulation is greatest when the displacement is between the maximum correlation position and the first minimum (10 A. in the case of $SO_2$), there is an advantage in the case of reasonably regular spectrums in using displacements of somewhat greater amplitude. In the case of $SO_2$ for example, it is advantageous to sweep between positions 20 A. on either side of the maximum correlation position. This still produces generally sinusoidal A.C. waveforms, but of exactly four times the frequency of the vibration frequency (fundamental frequency) of the refractor plate 16. This is advantageous as the A.C. modulation attributable to the presence of $SO_2$ is more easily discriminated from unwanted A.C. modulation occurring at the fundamental frequency which are due to such effects as variations with wave length in the intensity of the light illuminating the gas or vapour, variations in reflection losses at the refractor plate as a function of angular position, and variations in the sensitivity of the photodetector 21 with the direction of the light incident upon it. While such variations can largely be eliminated electronically, it has been found desirable in practice to work at harmonics of the fundamental frequency so as to more easily separate the desired signals from signals unrelated to the spectral structure of the gas or vapour being analyzed. In the case of highly irregular spectrums, however, this technique apparently is not possible and such extraneous modulation must be eliminated electronically.

In the spectrometer described in detail above, the dimensions of the mask 19 were 0.8 cm. x 1 cm. The slit 14 was 10 A. wide and about 0.8 cm. high. The diffraction grating 15 measured 2.3" square, and its dispersion was about 33. A per mm. (1200 lines/mm.). The grating angle was about 11°. The focal length of the objective lens 11 was 21.5", and the focal length of the mirror 18 was 10". The distance between the slit 14 and the mirror 18 was 10", and between the grating 15 and the mirror 18 7".

Electronics

The output of the photodetector 21 normally consists of a D.C. voltage that is proportional to the intensity of the incoming light, and as stated above an A.C. modulation voltage is impressed on the D.C. voltage when the spectrum falling on the mask correlates with the lines on the mask. The circuit shown in block form in FIG. 5 is adapted to measure the level of the A.C. modulation voltage and at the same time compensate for random changes in the level of the output of the photodetector 21 due to changes in the overall intensity of the background illumination. The output of the photodetector 21, which in this case preferably is a photomultiplier, is amplified by a preamplifier 22 and then is fed to an amplifier 23 tuned to the vibration frequency of the torsional chopper 17, e.g. about 100 c.p.s. or the appropriate harmonic. The output of the tuned amplifier 23 is detected by a synchronous detector 24. The torsional chopper 17 is energized by a chopper drive circuit 15 (e.g. a 100 c.p.s. oscillator and amplifier). The vibration frequency of the torsional chopper 17 is the same as the frequency of the energizing voltage. A reference phasing and squaring circuit 26 is a conventional circuit that is adapted to produce a stable periodic square wave of the required vibration frequency (e.g. 100 c.p.s.) or the required harmonic thereof (if the A.C. modulation is a harmonic of the vibration frequency) and preferably of adjustable phase, for synchronizing the synchronous detector 24. The frequency of the reference phasing and squaring circuit 26 is controlled by an A.C. signal of the required frequency derived from the chopper drive circuit 25. The square wave output of the reference phasing and squaring circuit 26 is fed to the synchronous detector 24 so that the output of the synchronous detector 24 consists of components that are in phase with the vibration frequency of the torsional chopper 17 or the appropriate harmonic thereof. The output of the synchronous detector 24, which consists of a D.C. voltage proportional to the level of the A.C. modulation components, is fed to an integrator 27 and indicated by means of a meter 28 or other suitable indicator, such as a recorder or conventional readout or telemetry circuits. When signal levels are high, good results can be obtained even without the synchronous detector 24 and its associated circuitry. Any conventional means (e.g. normalization of the signal by AGC techniques) can be employed to derive the ratio of the intensity of the light transmitted through the mask in the maximum and minimum correlation positions.

Compensation for varying levels of background illumination is conveniently provided by automatically changing the gain of the photomultiplier (photodetector 21) to maintain its D.C. output at a substantially constant level. For this purpose, a low pass amplifier 29 is connected to the output of the preamplifier 22 (see point "A" FIG. 5). The low pass amplifier 29 has a cutoff frequency of about 10 c.p.s., so that any A.C. voltages of higher frequency, such as the A.C. modulation components, are not amplified. A comparator circuit 30 (e.g. differential amplifier) is connected to the output of the low pass amplifier 29 and to the output of a reference cicruit 31 (labeled in FIG. 5 as "reference for brightness control") that is adapted to provide an adjustable D.C. bias. The output of the comparator 30, which consists of the difference between the output voltages of the low pass amplifier 39 and the selected bias level of the reference circuit 31, is fed to a high voltage regulator 32 that is adapted to control the level of the high voltage produced by a high voltage supply 33. The controlled high voltage is fed to the photomultiplier. In operation, the voltage of the reference circuit 31 is set at a level that will result in a selected photomultiplier gain for a given intensity of background illumination. As long as the intensity of the background illumination remains the same, the output of the comparator 30 will be zero. If the intensity of the background illumination varies from normal, however, the output voltage of the low pass amplifier 29 will become larger or smaller (depending on whether the intensity increases or decreases) than the selected bias level of the reference circuit 31. This unbalance condition results in a voltage being supplied to the high votage regulator 32, and a corresponding change is thereby made in the level of the photomultiplier high voltage until balance conditions again are reached.

The spectrometer may be calibrated by employing absorption cells containing selected gases or vapours between a source of light and the spectrometer, and observing the levels of the output of the integrator 27 with variations in the concentration of the gas or vapour and variations of path length. After the instrument has been calibrated, measurements of the concentration of the particular gas or vapour can be made remotely, for example by pointing the objective lens 11 of the spectrometer towards a smokestack in order to measure $SO_2$ levels. In addition, the spectrometer can be used in the laboratory for measuring concentrations or flow rates of gases or vapours pumped through absorption cells located between a source of light and the spectrometer. While the gas or vapour being analyzed is usually located outside the spectrometer, it is possible to introduce the gas or vapour inside the spectrometer, e.g. between the mirror 18 and the mask 19 or between the mask 19 and the photodetector 21. In this case, the mask 19 would act as a selective filter for the particular wavelengths it represents.

In the embodiment described in detail above, the refractor plate 16 and the torsional chopper 17 constituted the means for cyclically varying the degree of correlation between the spectrum and the lines of the mask. Other examples of such means are as follows.

In FIG. 6, a pair of refractor plates 23, 35 are cemented together on a small block 36 secured to one tine of a tuning fork 37. The plates 34, 35 are positioned so that when the tuning fork is forced to vibrate, the plates 34 and 35 alternately come into the path of the light in the spectrometer. When the plate 34 is in the light path, for example, the light is refracted so that the spectrum correlates with the lines on the mask; when the plate 35 is in the light path, the spectrum is appropriately shifted. Conventional means (not shown) is used for causing the tuning fork 37 to vibrate continuously.

FIG. 7 shows, somewhat diagrammatically, an embodiment wherein the mask is vibrated instead of the spectrum. Light from a source 38 passes through an entrance slit 39 and is dispersed by a prism 40. A Littrow mirror 41 reflects the light back through the prism 40, from whence it is refracted to a mask 42. The mask 42 is the same as the mask 19 described above, but in this case it is vibrated by means of a motor 43 and cam driver mechanism 44. After passing through the mask 42 the light is directed by a lens 45 towards a photodetector 46.

In FIG. 8, the correlation varying means operates by bringing mast 47 into and out of the plane where the spectrum is imaged. In the solid line position of the mask 47, the mask 47 is in the plane of the spectrum and optimum correlation occurs. In the dotted line position, the mask 47 is slightly spaced from the plane of the spectrum so that the light at the mask 47 is sufficiently defocused. In this condition correlation is absent. The mask 47 may be driven by any suitable mechanism, such as a motor 48 and eccentric drive 49, shown diagrammatically. The usual lens and photodetector is also shown in FIG. 8.

FIG. 9 shows a further embodiment wherein the correlation varying means operates by varying the angle between the spectral images and the lines of the mask. This may be accomplished by rotating the entrance slit back and forth through a small angle. In FIG. 9 entrance slit 50 is rotatably supported in a hollow bearing 51, and is rotated back and forth by a torque motor 52 driving belt 53. Assuming the lines of the mask are vertical, optimum correlation occurs when the slit 50 is vertical. When the slit 50 is rotated, however, the spectral images form an angle with the lines of the mask (see FIG. 9*a*) and correlation is absent.

Finally, the embodiment of FIG. 10 represents yet another embodiment of the invention. In this case, the incoming light passes through an entrance slit 54, is collimated by a lens 55, and dispersed by a prism 56. After passing through the prism 56, the light is reflected off the surface of a rotatable Littrow mirror 57 which is rocked to and fro about an axis 58 by a torque motor 59. The light then passes through the prism 56 a second time and is directed towards either one of a pair of identical marks 60 and 61, depending upon the position of the mirror 57. In one extreme position of the mirror 57, the spectral images are imaged on the mask 60, and in the other extreme position they are imaged on the mask 61. The masks 60 and 61 are identical, as indicated above, and are constructed in the same manner as the masks previously described. However, in this case the two masks 60, 61 are offset slightly in the direction of dispersion so that the desired spectral images (when present) correlate with one of the masks and do not correlate with the other mask. The distance by which the masks 60, 61 are offset corresponds to the preferred amplitude of displacement discussed above with reference to the embodiment of FIG. 1. After passing through either of the masks 60, 61, the light is directed by a suitable lens 62 towards a photodetector 63, the output of which can be analyzed as described above.

What we claim as our invention is:

1. In a spectrometer having an entrance slit, means for dispersing light passing through the entrance slit to resolve the characteristic spectra of a particular substance when the characteristic spectra are present in the light, the dispersing means including focussing means for producing a set of images of the entrance slit corresponding to said characteristic spectra, the slit images being dispersed in a given direction of dispersion and being formed in a focal plane, mask means having a plurality of relatively opaque and transparent regions, said regions being correlative with the set of slit images corresponding to the characteristic spectra of a particular substance, the mask means being located in said focal plane, and a photodetector positioned for receiving light which has passed through the mask means, the photodetector producing an output signal proportional to the intensity of the light shining upon it, the improvement comprising:

(a) means for cyclically varying the relative positions of the slit images and the mask means at a rapid and constant rate of repetition between a first position wherein the slit images correlate with said regions of the mask means and a second position wherein there is a slight relative displacement, in the said direction of dispersion, between the slit images and corresponding correlative regions of the mask means, whereby the intensity of the light passing through the mask means is cyclically varied from a maximum in said first position to a minimum in said second position in response to the varying relative positions of the slit images and the mask means when the characteristic spectra are present in the light, so that said output signal of said photodetector is thereby modulated by an alternating current signal attributable to the existence of the said characteristic spectra in the light, (b) means coupled to the photodetector for amplifying the said alternating current signal separately from other components of the said output signal, and (c) means coupled to said amplifiying means for measuring the level of the amplified alternating current signal independently of other components in the output signal.

2. Apparatus as claimed in claim 1 wherein the repetition rate of the position varying means (a) is between 10–200 cycles per second.

3. Apparatus as claimed in claim 1 wherein the mask means includes a photographic transparency containing images corresponding to the characteristic spectra of a particular substance.

4. Apparatus as claimed in claim 1 wherein the mask means is stationary and wherein said position varying means (a) includes a refractor plate having optically flat and parallel opposed faces that are in the path of and substantially normal to the light beam, and a torsional chopper coupled to the refractor plate for vibrating the refractor plate.

5. Apparatus as claimed in claim 1 wherein means is provided for synchronously detecting the said alternating current signal, and means for synchronizing said detecting means with said position varying means (a).

6. Apparatus as claimed in claim 1 wherein the said characteristic spectra are substantially regularly spaced, wherein said cyclically varying means displaces said slit images by a distance substantially equal to twice the peak to peak spacing of the said characteristic spectra; whereby the said alternating current signal is the fourth harmonic of the repetition rate of said position varying means (a).

7. Apparatus as claimed in claim 6 wherein the photodetector is a photomultiplier having a direct current output component, and wherein means is provided for automatically adjusting the gain of the photomultiplier to maintain its direct current output component at a substantially constant level.

8. Apparatus as claimed in claim 1 wherein the mask means is stationary and wherein the position varying means (a) consists of a pair of refractor plates fixed to one tine of a tuning fork, said plates being positioned so that they are alternately brought into and out of the path of light in the spectrometer with the vibration of the tuning fork, one of said plates being positioned to shift the light passing through it in a direction different from that of the other of said plates.

9. A spectrometer as claimed in claim 1 wherein said position varying means (a) includes means for vibrating the mask means in the direction of the dispersion of the spectrum, and wherein said slit images are stationary.

10. Apparatus as claimed in claim 5 wherein the repetition rate of the position varying means (a) is between 10–200 cycles per second, wherein said other components of said photodetector output is a direct current voltage, and wherein means is provided for automatically normalizing the output of the photodetector to maintain said direct current voltage at a substantially constant level.

11. Apparatus as claimed in claim 6 wherein the repetition rate of the position varying means (a) is between 10–200 cycles per second, wherein said other components of said photodetector output is a direct current voltage and wherein means is provided for automatically normalizing the output of the photodetector to maintain said direct current voltage at a substantially constant level.

12. Apparatus as claimed in claim 10 wherein the mask means is stationary and wherein the position varying means (a) consists of a pair of refractor plates fixed to one tine of a tuning fork, said plates being positioned so that they are alternately brought into and out of the path of light in the spectrometer with the vibration of a tuning fork, one of said plates being positioned to shift the light passing through it in a direction different from that of the other of said plates.

13. In a spectrometer having an entrance slit, means for dispersing light passing through the entrance slit to resolve the characteristic spectra of a particular substance when the characteristic spectra are present in the light, the dispersing means including focussing means for producing a set of images of the entrance slit corresponding to said characteristic spectra, the slit images being dispersed in a given direction of dispersion and being formed in a focal plane, mask means having a plurality of relatively opaque and transparent regions, said regions, being correlative with the set of slit images corresponding to the characteristic spectra of a particular substance, the mask being located in said focal plane, and a photodetector positioned for receiving light which has passed through the mask means, the photodetector producing an output signal proportional to the intensity of the light shining upon it, the improvement comprising:

(a) means for cyclically varying the degree of focus of said spectral images relative to the mask means at a rapid and constant rate of repetition between a first condition wherein said slit images are in focus in said focal plane and correlate with said regions of said mask means and a second condition wherein said spectral images are focussed in a plane spaced from said mask means, whereby the intensity of the light passing through the mask means is cyclically varied from a maximum in said first condition to a minimum in said second condition when the characteristic spectra are present in the light, so that the output signal of the photodetector is thereby modulated by an alternating current signal attributable to the existence of said characteristic spectra in said light, (b) means coupled to the photodetector for amplifying the said alternating current signal and separating it from the remainder of said output signal, and (c) means coupled to said amplifying means for indicating the level of the amplified alternating current signal.

14. Apparatus as claimed in claim 13 wherein the focus varying means includes means for vibrating the mask means in the direction of the path of light passing through the mask means.

15. Apparatus as claimed in claim 14 wherein the repetition rate of the focus varying means is between 10–200 cycles per second and wherein the mask means includes a photographic transparency containing images corresponding to the characteristic spectra of a particular substance.

16. In a spectrometer having an entrance slit, means for dispersing light passing through the entrance slit to resolve the characteristic spectra of a particular substance when the characteristic spectra are present in the light, the dispersing means including focussing means for producing a set of images of the entrance slit corresponding to said characteristic spectra, the slit images being dispersed in a given direction of dispersion and being formed in a focal plane, mask means having a plurality of relatively opaque and transparent regions, said regions being correlative with the set of slit images corresponding to the characteristic spectra of a particular substance, the mask means being located in said focal plane, and a photodetector position for receiving light which has passed through the mask means, the photodetector producing an output signal proportional to the intensity of the light shining upon it, the improvement comprising:

(a) means for cyclically varying the degree of correlation between said slit images and said mask at a rapid and constant rate of repetition between a first condition wherein the slit images correlate with said regions of the mask means and a second condition wherein said slit images are rotated slightly relative to said regions in a plane parallel to said mask means, whereby the intensity of the light passing through the mask means is cyclically varied from a maximum in said first condition to a minimum in said second condition when the characteristic spectra are present in the light, so that the output signal of the photodetector is thereby modulated by an alternating current signal attributable to the existence of said characteristic spectra in said light, (b) means coupled to the photodetector for amplifying the said alternating current signal and separating it from the remainder of said output signal, and (c) means coupled to said amplifying means for indicating the level of the amplified alternating current signal.

17. Apparatus as claimed in claim 16 wherein the entrance slit is rotatably supported in a bearing, and the correlation varying means includes means for rotating the entrance slit to and fro about a position wherein the entrance slit is parallel with said regions of said mask means.

18. Apparatus as claimed in claim 17 wherein the repetition rate of the cyclically varying means is between 10–200 cycles per second and wherein the mask means includes a photographic representation of the spectral images corresponding to the characteristic spectra of a particular substance.

19. A spectrometer comprising:

(a) an entrance slit, (b) means for dispersing light passing through the entrance slit to resolve the characteristic spectra of a particular substance when the characteristic spectra are present in the light, the dispersing means including focussing means for producing a set of images of the entrance slit corresponding to said characteristic spectra, the slit images being dispersed in a given direction of dispersion and being formed in a focal plane, (c) a pair of masks having an identical pattern of opaque regions separated by transparent regions, said pattern being correlative with the set of slit images corresponding to the characteristic spectra of a particular substance, said masks being located in said focal plane and being slightly offset relative to one another in the direction of dispersion of said slit images, (d) means for cyclically varying the relative positions of the slit images and said masks at a rapid and constant rate of repetition between a first position wherein light containing said slit images passes through one of said masks only and said slit images correlate with said regions of said one mask, and a second position wherein the light containing said slit images passes through the other of said masks only, whereby the intensity of the light passing through said one mask is a maximum and the intensity of the light passing through the other mask is a minimum when said characteristic spectra are present in the light, (e) a photodetector and means for collecting light which has passed through each mask and directing it to the photodetector, the photodetector producing an output signal which is modulated by an alternating current signal attributable to the existence of the said characteristic spectra in the light, (f) means coupled to the photodetector for amplifying the said alternating current signal separately from other components of the said output signal, and (g) means coupled to said amplifying means for measuring the level of the amplified alternating current signal independently of other components in the output signal.

20. Apparatus as claimed in claim 19 wherein the repetion rate of the cyclically varying means is between 10–200 cycles per second and wherein each mask is a photographic representation of the spectral images corresponding to the characteristic spectra of a particular substance.

*21. A spectrometer comprising:*

*(a) an entrance slit,*

*(b) means for dispersing light passing through the entrance slit to resolve the characteristic spectra of a particular substance when the characteristic spectra are present in the light, the dispersing means including focussing means for producing a set of images of the entrance slit corresponding to said characteristic spectra, the slit images being dispersed in a given direction of dispersion and being formed in a focal plane,*

*(c) a pair of identical masks each having a pattern of opaque and transparent regions, said masks being located in said focal plane,*

*(d) means for cyclically varying the relative positions of the slit images and said masks at a rapid and constant rate of repetition between a first position wherein light containing said slit images passes through one of said masks only and a second position wherein the light containing said slit images passes through the other of said masks only, said masks being positioned so that the intensity of the light passing through said one mask is a maximum and the intensity of the light passing through the other mask is a minimum when said characteristic spectra are present in the light,*

*(e) a photodetector and means for collecting light which has passed through each mask and directing it to the photodetector, the photodetector producing an output signal which is modulated by an alternating current signal attributable to the existence of the said characteristic spectra in the light,*

*(f) means coupled to the photodetector for amplifying the said alternating current signal separately from other components of the said output signal, and*

*(g) means coupled to said amplifying means for measing the level of the amplified alternating current signal independently of the other components in the output signal.*

References Cited

The following references, cited by the Examiner, are of record in the patented file of this patent or the original patent.

UNITED STATES PATENTS

| | | | |
|---|---|---|---|
| 2,630,736 | 3/1953 | Beitz | 356—83 |
| 2,751,811 | 6/1956 | Vreeland | 356—86 |
| 2,941,443 | 6/1960 | McNally | 250—43.5 |
| 3,012,467 | 12/1961 | Rosenthal | 356—83 |
| 3,052,154 | 9/1962 | Bolz | 356—99 |
| 3,071,037 | 1/1963 | Brumley | 356—94 |

OTHER REFERENCES

Applied Optics, vol. 5. #11, November 1966, p. 14.

VINCENT P. McGRAW, Primary Examiner

U.S. Cl. X.R.

250—237 G; 356—97